United States Patent [19]

Dinh

[11] Patent Number: 4,557,252

[45] Date of Patent: Dec. 10, 1985

[54] FREEZE PROTECTION VALVE AND SYSTEM

[75] Inventor: Khánh Dinh, Gainesville, Fla.

[73] Assignee: Pulstar Corporation, Gainesville, Fla.

[21] Appl. No.: 648,351

[22] Filed: Sep. 7, 1984

Related U.S. Application Data

[63] Continuation of Ser. No. 485,503, Apr. 15, 1983, abandoned.

[51] Int. Cl.$^4$ ................................................. F24J 3/02
[52] U.S. Cl. ........................................ 126/420; 126/422; 126/437; 137/62; 137/468; 236/99 R
[58] Field of Search .............. 126/420, 422, 437; 237/80; 137/59, 61, 62, 468, 79, 81.1; 251/282; 236/58, 93 A, 98, 99 R

[56] References Cited

U.S. PATENT DOCUMENTS

| | | | |
|---|---|---|---|
| 1,554,344 | 6/1921 | Haapanen | 137/62 |
| 1,971,242 | 5/1929 | Wheller | 126/422 |
| 2,365,650 | 12/1944 | Shaw et al. | 251/61.3 X |
| 2,762,569 | 9/1956 | Caillol | 126/422 X |
| 2,838,043 | 6/1958 | Bliss | 126/437 |
| 3,618,625 | 11/1971 | Walters | 137/62 |
| 3,986,489 | 10/1976 | Schlesinger | 126/422 X |
| 4,016,804 | 4/1977 | Turecek | 236/99 R |
| 4,019,495 | 4/1977 | Frazier et al. | 126/422 X |
| 4,119,087 | 10/1978 | Cook | 126/420 |
| 4,133,338 | 1/1979 | Honikman | 126/420 |
| 4,138,996 | 2/1979 | Cartland | 126/420 |
| 4,153,040 | 5/1979 | Harrison et al. | 126/420 |
| 4,207,866 | 6/1980 | Boyd | 126/420 |
| 4,246,886 | 1/1981 | Sitzlar | 126/420 |
| 4,280,478 | 7/1981 | Duval et al. | 126/420 |
| 4,286,613 | 9/1981 | Lacoste | 137/62 |
| 4,336,792 | 6/1982 | Seiler | 126/420 |
| 4,344,450 | 8/1982 | Walters | 137/62 |

FOREIGN PATENT DOCUMENTS 51253 4/1980 Japan ................................. 126/420

OTHER PUBLICATIONS

Freeze Protection Valve FPV-1 and FPV-2; Sheltech price list, Nov. 1, 1982.
Eaton Control Div.-Dole Freeze Protection Valve FP-45; price list, Jan. 15, 1983.
Precision Products H&H Freeze Prevention Bleed Valve Model V243.

Primary Examiner—Margaret A. Focarino
Attorney, Agent, or Firm—Schwartz, Jeffery, Schwaab, Mack, Blumenthal & Evans

[57] ABSTRACT

The present invention is a device for a solar heating system having a solar collector, a storage tank connected to the solar collector, a pump for circulating liquid from the tank to the solar collector, a supply of liquid at a temperature above freezing and a connection from the supply of liquid to the solar collector for replacing any liquid lost from said solar collector. The device comprises a sensor for sensing the temperature of liquid in the solar collector, and a valve for bleeding liquid from the solar collector when the sensed temperature falls below a predetermined minimum whereby cool liquid in the solar collector is automatically replaced by liquid at a temperature above freezing.

13 Claims, 3 Drawing Figures

FREEZE PROTECTION VALVE AND SYSTEM

This application is a continuation of application Ser. No. 485,503, filed 04/15/83, and now abandoned.

BACKGROUND OF THE INVENTION

1. Field of the Invention

The present invention relates to devices used for preventing exposed fluid supply and fluid circulation systems from freezing during cold weather. More particularly, the present invention relates to solar heating systems and devices for preventing heat exchange fluid in such systems from freezing during periods of low insolation when the ambient temperature is below the freezing point of the heat exchange fluid.

2. Discussion of Related Art

Due to the relatively recent large increases in the cost of fossil fuel, solar heating has become increasingly popular. Solar systems are particularly useful for producing hot water for domestic use in place of conventional fossil fuel or electric water heaters. However, problems with such systems occur when the ambient temperature surrounding the solar panel becomes exceedingly low thereby causing the heat exchange fluid in the solar panel to freeze. There are, of course, various means of preventing the heat exchange fluid from freezing. For instance, antifreeze can be used in the fluid itself; however, this solution requires that a separate heat exchanger be used to transfer heat to the domestic hot water. This results in a relatively expensive system. It is preferable to heat the water to be used for domestic purposed directly in the solar panel.

Various solutions have been suggested to prevent domestic water from freezing in solar panels. For example, U.S. Pat. No. 4,119,087 to Cook discloses a system for protecting solar panels from freezing which system includes a temperature sensor disposed to sense the temperature of water in a manifold header of a solar collector. When the temperature drops below a predetermined safe limit, the system circulator pump operates so that the cold water is transferred to the system's storage tank and stored, warm water is transferred to the solar collector. This type of system is inefficient since the energy being stored in the warm water is dissipated to keep the solar panels from freezing.

U.S. Pat. No. 3,986,489 to Schlesinger shows a freeze protection system wherein a thermaster is disclosed in the solar collector and causes a dump valve to open when a temperature drops below a dangerous level. The solar collector is entirely evacuated in this manner so that no freezable liquid remains.

U.S. Pat. No. 3,618,625 to Walters shows a freeze prevention system for a water storage tank such as a cattle trough or the like. Water stored in the tank is prevented from freezing by opening a valve which conducts a restricted outflow of water under control of a temperature sensing element located adjacent the surface of the water where freezing begins. The outflow of water induces inflow of water at a higher temperature from a remote source to maintain the temperature level of the water within the tank above an adjusted value.

U.S. Pat. No. 4,280,478 to Duval et al shows a freeze protection apparatus for solar collectors in which the working fluid contained in the communicating tubes of the solar collector is allowed to drain from both the input and output tubes of the collector when a first predetermined temperature of the working fluid is detected. The collector is allowed to fill through the input and output tubes when a second predetermined temperature is detected.

Various valves have been suggested for permitting a small flow of liquid through a pipe in response to a sensed low ambient temperature in order to prevent the fluid from freezing. U.S. Pat. No. 4,344,450 to Walters and U.S. Pat. No. 4,286,613 to Lacoste show the construction of two such valves. The Lacoste valve uses "Freon 502" in the sensing apparatus of the valve to produce a pressure tending to hold the valve closed when the ambient temperature is at a safe level.

U.S. Pat. No. 1,554,344 to Happanen shows a thermostatic valve for use in a water circulation system to prevent freezing. The valve includes a chamber containing an expansible and contractable fluid which causes the valve to open to allow water to escape when the temperature of the water falls below a safe level.

U.S. Pat. No. 1,971,242 to Wheeler shows a solar water heater having a valve which opens when the temperature of the water and the solar collector increases to a prescribed limit to allow the heated water to enter a storage chamber.

U.S. Pat. No. 4,153,040 to Harrison et al shows a protective system for a solar collector which includes a bulb disposed in the solar collector. The bulb contains a vaporizable antifreeze liquid which expands when the temperature in the collector rises to open a valve which permits overheated water in the solar collector to escape and permits fresh, cool water to enter the solar collector.

U.S. Pat. No. 2,365,650 to Shaw et al shows a water valve structure which is particularly adapted for controlling the flow of cooling water to the condensor of a refrigeration system. The valve is connected to a pressure line such as the refrigerant line of a refrigeration system. The valve opens when pressure in the system builds up thus permitting cooling water to flow through the condensor.

SUMMARY OF THE INVENTION

One object of the present invention is to provide a system for preventing damage to the solar panel or collector of a solar heating system due to freezing of the heat exchange liquid in the solar panel, wherein no antifreeze is used.

A further object of the present invention is to provide a system for preventing heat exchange liquid from freezing in a solar panel which system operates automatically without need of an external electrical power source.

A further object of the present invention is to provide a system for preventing the freezing of heat exchange liquid in a solar collector panel which system takes advantage of pressurized water supplied by a municipal supply or the like to increase the temperature within the solar panel to a level above freezing.

An even further object of the present invention is to provide a system for preventing the freezing of heat exchange liquid in a solar collector panel which system can be installed in an existing solar heating system without the need of major modifications.

Yet another object of the present invention is to provide a system to prevent freezing of heat exchange liquid in a solar collector panel which system is relatively simple in construction, yet durable and effective in use.

In accordance with the above and other objects, the present invention is a freeze protection device used in combination with a solar heating system having a solar collector, a storage tank connected to the solar collector, a pump for circulating liquid from the tank to the solar collector, and a means for maintaining liquid in the solar tank at a predetermined pressure. The means includes a supply of liquid and a connection from the liquid supply to the solar collector for replacing any liquid lost from the solar collector. The freeze protection device comprises a means for sensing the temperature of liquid in the solar collector, and means for bleeding liquid from the solar collector when the sensed temperature falls below a predetermined minimum whereby cool liquid in the solar collector is automatically replaced by liquid at a temperature above freezing.

In accordance with other aspects of the invention, a system is provided for preventing liquid from freezing in a container filled with the liquid. The system comprises a source of liquid at a temperature above the freezing temperature of the liquid and means connecting the source of liquid to the container for automatically replacing any liquid lost from the container. A means for sensing the temperature of liquid in the container is provided comprising a sensing bulb disposed in the liquid in the container and a heat sensitive fluid disclosed in the sensing bulb. The fluid is transformed from a liquid state to a vapor state in response to an increase in temperature. A pressure sensitive valve is disposed externally of the container for permitting the liquid in the container to flow from the container, when actuated. An actuation means is provided for actuating the valve. The actuation means comprises a chamber disposed externally of the solar panel and a pressure applying means contained in the chamber. The pressure applying means is in communication with the pressure sensitive valve and a capillary tube connects the sensing bulb with the chamber to allow fluid in the sensing bulb to expand into the actuation chamber thereby causing the pressure applying means to actuate the pressure sensitive valve. The volume of the fluid in the liquid state is less than the volume of the sensing bulb.

The present invention includes a temperature sensitive valve for use in a freeze protection system. The valve includes a valve body, a flow path defined in the valve body, a valve seat formed in the flow path, a valve member mounted for movement onto and off of the valve seat, and means for biasing the valve member normally away from the valve seat. An actuation element is mounted in an actuation housing for movement in response to pressure in the actuation housing. The actuation element is connected to the valve member for forcing the valve member toward the valve seat with a force which is responsive to the pressure. The actuation element and the actuation housing define a fluid chamber therebetween. A temperature sensing bulb is connected to the fluid chamber by a capillary tube and the heat sensitive fluid is disclosed in the fluid chamber, bulb, and capillary tube. The heat sensitive fluid has a volume in its liquid state which is greater than the volume of the fluid chamber and capillary tube, but less than the volume of the sensing bulb.

BRIEF DESCRIPTION OF THE DRAWINGS

The above and other objects of the present invention will become more readily apparent as the invention is more fully set forth in the detailed description to follow, reference being had to the accompanying drawings in which like reference numerals represent like parts throughout, and in which.

DETAILED DESCRIPTION OF THE PREFERRED EMBODIMENT

Figure 1:
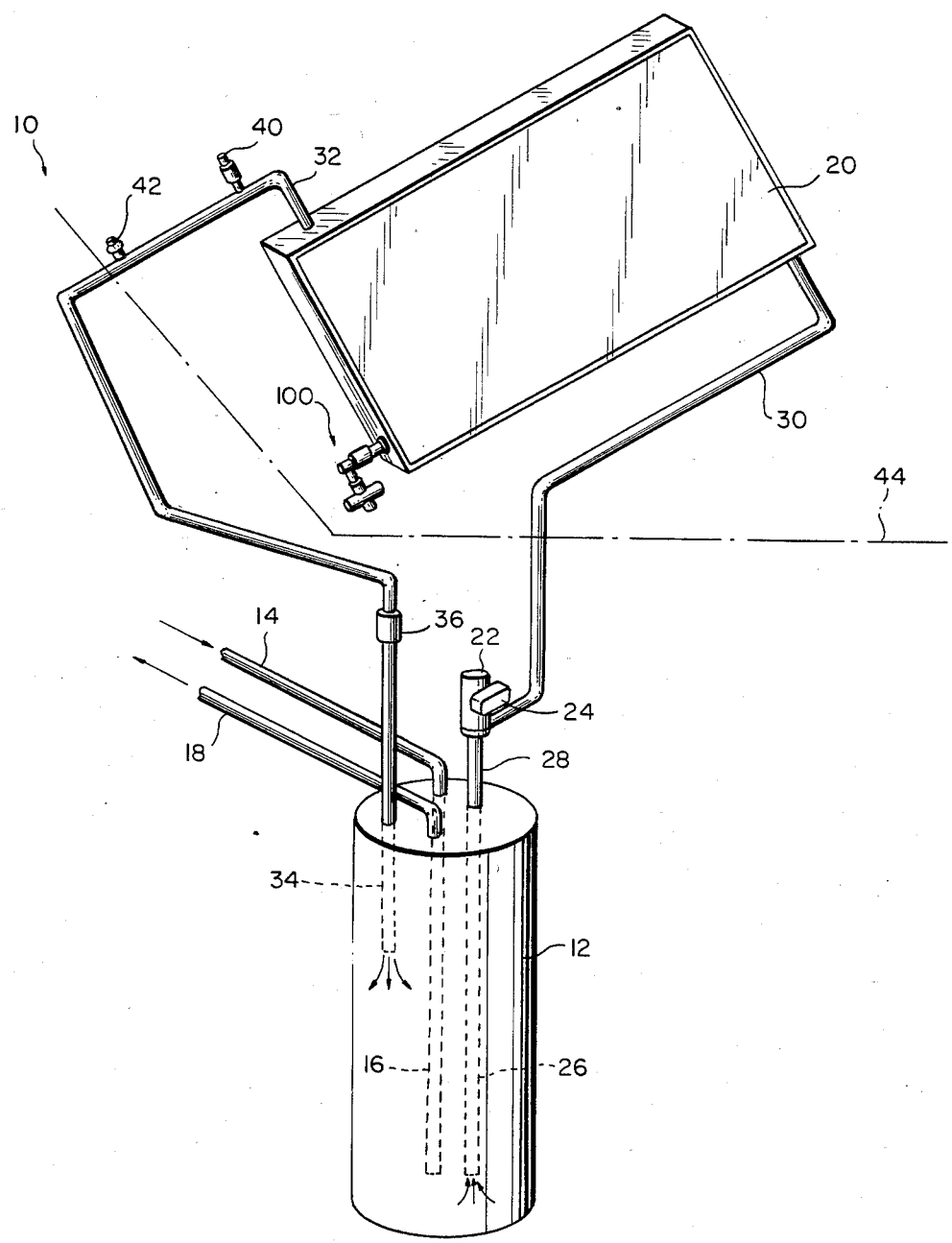
FIG. 1 is a diagrammatic illustration of a hot water solar heater employing the freeze protection system of the present invention.

FIG. 1 shows a solar heater 10 which is designed to produce hot water for domestic use. It will be understood that while the present invention is described in use with the solar heater of FIG. 1, the invention can be used with other water circulation systems.

Solar heater 10 includes a hot water storage tank 12 which is supplied with water through inlet pipe 14. Pipe 14 can be connected to a municipal water supply or any other source of pressurized water. Water entering inlet line 14 is cold water to be heated by the solar heater. However, it should be understood that this cold water is at a temperature well above freezing. In most cases, the water will have a temperature ranging from 60° to 72° Fahrenheit. Inlet pipe 14 is connected to a dip tube 16 which extends substantially to the bottom of tank 12 so that the cold water entering tank 12 will not interfere with the warmer water present at the top of the tank. Warm water at the top of tank 12 is drawn off by outlet tube 18 for domestic consumption. It will be understood that the water entering line 14 is under pressure which causes the warm water at the top of tank 12 to exit through line 18 when a valve or the like (not shown) is opened at the terminal end of line 18. Accordingly, as water is withdrawn from tank 12, the supply in the tank will be continuously replenished.

The water in tank 12 is heated by solar collector 20 which may be any conventionally available collector having a surface area of, for example, 40 square feet. The water from tank 12 is circulated through collector 20 by pump 22 which can be, for example, a D.C. powered pump which is activated by pump switch 24. Pump 22 draws the colder water from the bottom of tank 12 through dip tube 26 and pipe 28. The water is pumped through inflow pipe 30 to the inlet of solar collector 20. The water circulates through solar collector 20 in a conventional manner and exits through an outlet connected to outflow pipe 32. The warmed water circulates through pipe 32 into a smaller dip tube 34 which deposits the warmer water toward the top of tank 12. A check valve 36 is connected in outflow pipe 32. Check valve 36 is oriented to permit the flow of liquid only in the direction from collector 20 to tank 12 for reasons to be discussed hereinafter.

A standard air vent 40 and a standard vacuum breaker valve 42 are connected to the outflow pipe 32 in a conventional manner.

In a normal installation, tank 12 will be located in a warm environment indicated below dot-dash line 44 while solar collector 20 will be subject to environmental conditions indicated as being above line 44. In other words, while tank 12 is safe from any freezing environmental conditions, it is quite possible that the water in collector 20 will freeze if the temperature falls below 32° Fahrenheit. Naturally, if water freezes in solar collector 20, the expansion of the frozen water could severely damage the collector structure. Accordingly, it is necessary to protect the system against freezing. For this purpose, valve 100 is attached to collector 20. Valve 100 senses the temperature of the water in collector 100 and mechanically opens when the sensed temperature falls below a minimum value, for example, 34° Fahrenheit. When valve 100 opens, water in collector 20 is bled from the collector. At the same time, the water pressure at inlet line 14 forces cold water from the bottom of tank 12 through tube 26 and inflow line 30 to replace the water being bled. The cold water in collector 20 is automatically replaced with water at a higher temperature of, for example, 60° to 72° Fahrenheit in this manner.

It is preferable to place valve 100 on the opposite side of solar collector 20 from inflow line 30 so that all of the cool water will be drained prior to the system being filled with warmer water from tank 12. However, in order to prevent reverse flow of hot water through outflow line 32, it is necessary that check valve 36 be installed. Check valve 36 insures that the hot water at the top of tank 12 will not be drained through valve 100.

Figure 2:
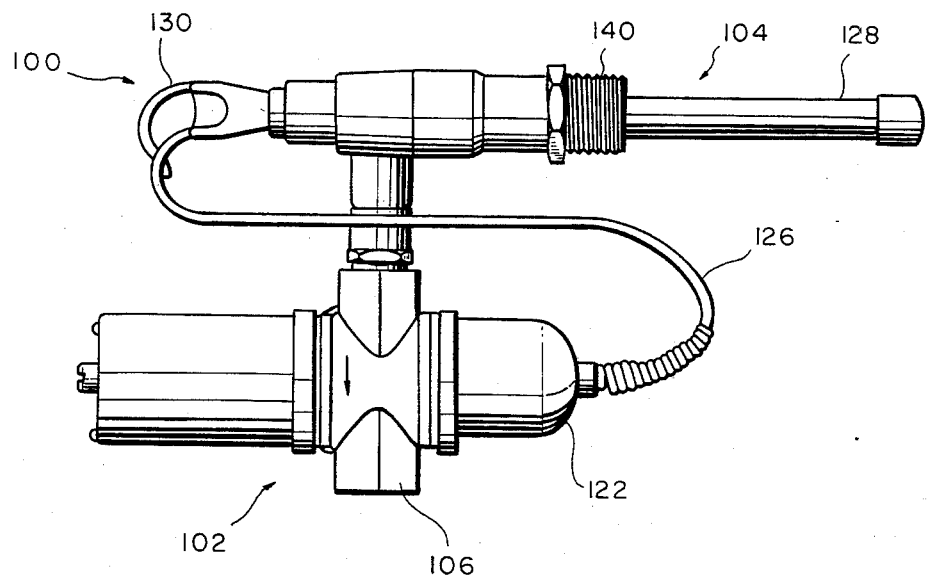
FIG. 2 is an elevational view of the temperature sensitive valve of the present invention.
Figure 3:
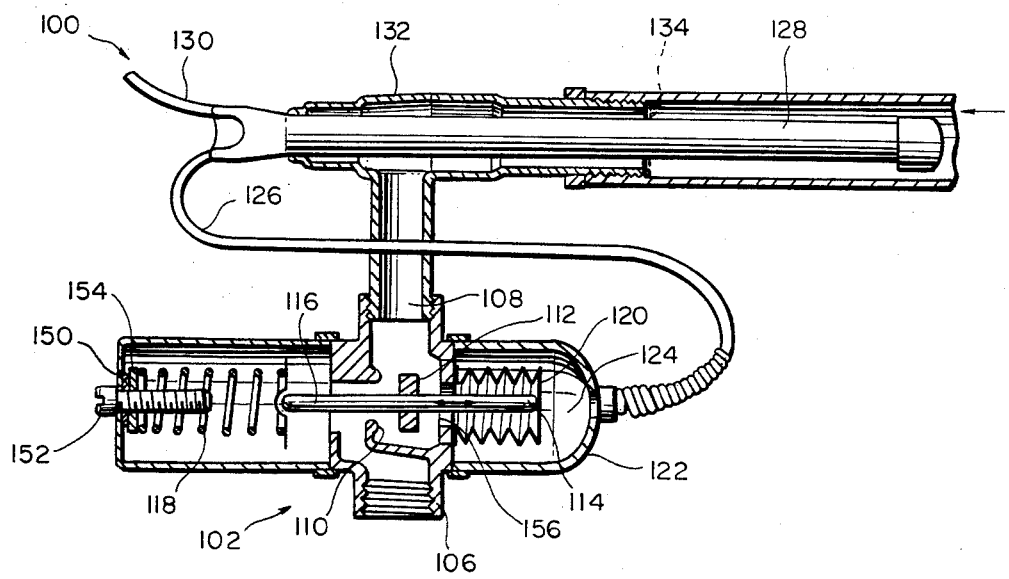
FIG. 3 is a longitudinal sectional view of the valve of FIG. 2.

FIGS. 2 and 3 show the construction of valve 100 in detail. Valve 100 includes a pressure sensitive valve 102 and a sensing portion 104 which senses temperature and converts this temperature to a pressure differential to operate valve 102.

Valve 102 includes a valve body 106 having a fluid flow path 108 in which a valve seat 110 is formed. A valve closure member 112 is connected to a closing actuation arm 114 and an opening actuation arm 116. Actuation arm 116 is biased to the right by a spring 118. Spring 118 urges valve 112 away from seat 110 and holds the pressure sensitive valve 102 in a normally open condition.

Actuation arm 114 is connected to the end of bellows 120 which can be compressed to force valve member 112 toward valve seat 110. Bellows 120 is contained in a housing 122 and a fluid chamber 124 is defined between housing 122 and bellows 120. Fluid chamber 124 is communicated through a capillary tube 126 to temperature sensing bulb 128. Bulb 128, capillary tube 126 and fluid chamber 124 are charged with a fluorocarbon, sold under the trademark "Freon", through charging tail 130.

Sensing bulb 128 is mounted in a flow housing 132 which is attached to solar collector 20 in communication with the liquid in the solar collector. Housing 132 is in communication with fluid flow channel 108 so that the water in collector 120 can flow directly to the position of valve closure member 112. A screen 134 can be disposed across the front of housing 132 to ensure that the valve will not be clogged with debris. It will be understood that valve 100 is connected to the solar collector by threaded nipple 140 or the like such that only the end of sensing bulb 128 extends into the solar collector while capillary tube 126 and pressure sensitive valve 102 are positioned externally of the collector. When the temperature in collector 20 is above a safe limit, the Freon in bulb 128 produces vapor having a pressure which is sufficient to compress bellows 120. This forces actuation arm 114 to the left as viewed in FIG. 3 to hold valve closure member 112 in a closed position. Accordingly, no liquid is bled from the collector. As the temperature in collector 20 falls, the vapor pressure produced by the Freon is reduced until the bias force of spring 118 overcomes the force of the Freon. This causes valve closure member 112 to open thereby permitting liquid to bleed from collector 120 through flow channel 108. The lower the temperature in collector 120, the wider valve closure member 112 opens. The water that bleeds out of collector 120 is replaced by cold water from the bottom of storage tank 12 and that water is replaced by water supplied through inlet pipe 14.

In order to adjust the temperature at which pressure sensitive valve 102 opens, a stop washer 150 is provided and makes a threaded connection with adjusting screw 152. Washer 150 moves a pressure plate 154 against spring 116. This causes the spring to be more or less compressed depending on the adjustment of screw 152. Preferably, the temperature at which the valve can open can be adjusted between approximately 32° and 52° Fahrenheit.

Pressure sensitive valve 102 is also pressure compensated by the use of a diaphragm 156 disposed between flow channel 108 and the area within bellows 120. This compensating diaphragm is necessary because, with closure member 112 in a closed position, the water pressure in flow channel 108 creates a force on valve member 112 which would affect the pressure at which the valve opens. However, diaphragm 156 is designed so that an equal and opposite pressure is created on the inside of bellows 120. A compressable fluid such as air or the like can be disposed within bellows 120. When diaphragm 156 flexes away from flow channel 108, the pressure of this gas increases. This pressure is equal and opposite to the pressure created directly on valve member 112.

Under stagnation, solar collectors can reach temperatures of over 400° Fahrenheit and generate destructive pressures. In order to prevent these pressures from affecting the operation of valve 100, the charge of Freon in the valve is distributed between bulb 128 disposed within the solar collector, and capillary tube 126 and fluid chamber 124 which are outside the solar collector. Accordingly, if the temperature within the solar collector rises excessively, the vaporized Freon in bulb 128 forces the Freon still in a liquid state into capillary tube 126 and the fluid chamber 124. This liquid Freon is then cooled by ambient temperature and the pressure within the valve is held within managable limits. However, the volume of Freon in the liquid state within the valve must be sufficient to ensure that at least a portion of the liquid Freon is available to bulb 128 in order that the temperature sensed by the bulb will cause vaporization to actuate pressure valve 102. Consequently, the total volume of liquid Freon at 40° Fahrenheit should be greater than the volume of fluid chamber 124 combined with the volume of capillary tube 126. This ensures that at least some of the liquid Freon is always available in sensing bulb 128.

On the other hand, on days when the water in collector 20 is colder than the ambient air, for example, during clear nights when collectors radiate infra-red energy, the system must be capable of reacting only to the temperature of the water in the collector. Under such circumstances, it is necessary that the volume of bulb 128 be greater than the volume of the Freon in its liquid state at 40° Fahrenheit so that all of the Freon can collect in the bulb and the pressure produced in chamber 124 will not be sufficient to hold the valve close when the water temperature drops below the danger level.

Accordingly, as can be understood from above, by charging the valve 100 with a volume of Freon at 40° Fahrenheit which is greater than the volume of fluid chamber 124 combined with the volume of capillary tube 126 and also less than the total capacity of sensing tube 128, valve 100 will respond only to the temperature of the water in collector 120 and the pressures within the valve sensing system will not rise to an extent where they will damage the valve in any way. However, it should also be noted that because valve 100 is held normally open by spring 118 if any damage should occur to the housing 122, tube 126 or bulb 128, leakage of the Freon would simply cause valve member 112 to open and water would drip from collector 20. Thus, the solar collector would still be safe from freezing and the damage to valve 100 would be evidenced by a leakage of water. The system of the present invention is substantially fail safe in this regard.

A single valve 100 can be used to protect a plurality of collectors. For example, a valve having a maximum opening of 0.375 inches is sufficient to protect 10 collectors in an array if the valve is properly positioned. In this regard, it is noted that valve 100 pictured in FIG. 1 is positioned in an acceptable position since the valve is on the opposite side of collector 20 from the inflow line 30. However, another acceptable position would be directly at the outflow pipe 32. Preferably, if above five collectors are used, two valves 100 should be used. One valve should be positioned at the location of the outflow pipe of the array and one valve should be positioned as shown in FIG. 1 on the last collector in the array.

The foregoing description is set forth for the purpose of illustrating the present invention but is not considered to limit the invention in any manner. Clearly, numerous modifications to the present invention can be made without departing from the scope thereof as set forth in the appended claims.

What is claimed is:

1. For use in a solar heating system having a solar collector, a storage tank connected to said solar collector, a pump for circulating liquid from said tank to said solar collector, and means for maintaining liquid in said solar collector at a predetermined pressure, said means including a supply of liquid at a pressure above atmospheric and a temperature above freezing and a connection from said supply of liquid to said solar collector for replacing any liquid lost from said solar collector, a freeze protection device, comprising:
   means at least partially disposed within said solar collector for sensing the temperature of liquid in said solar collector, said sensing means including a temperature sensitive fluid which changes state from a liquid to a gas in response to an increase in temperature, said gas creating an increase in pressure in response to an increase in temperature;
   means responsive to said temperature sensitive fluid for bleeding liquid from said solar collector to ambient when said sensed temperature falls below a predetermined minimum, said connection being free of valves to inhibit the flow of liquid from supply to said solar collector when said bleeding means bleeds liquid, whereby cool liquid in said solar collector is automatically replaced by liquid at a temperature above freezing; and
   means for compensating for liquid pressure in said bleeding means such that said bleeding means opens to bleed said liquid substantially independently of liquid pressure within said solar collector.

2. The device as set forth in claim 1 wherein said bleeding means comprises a valve disposed externally of said solar collector and a fluid line connecting said valve to said solar collector, and said means for sensing comprises a passive, power independent sensing bulb disposed in said solar collector and a control means responsive to said sensing bulb for opening and closing said valve.

3. The device as set forth in claim 2 wherein said valve comprises a valve member, a valve seat and means for normally biasing said valve member away from said valve seat, and said control means comprises a control arm for acting against said biasing means.

4. The device as set forth in claim 1 wherein said bleeding means comprises a pressure sensitive valve, and said sensing means comprises a sensing bulb disposed in said solar collector, a capillary tube connecting said valve to said bulb, and a temperature sensitive fluid in said bulb, said temperature sensitive fluid creating a pressure which increases with an increase in temperature of said fluid.

5. The device as set forth in claim 1 wherein said freeze protection device includes means for adjusting the temperature of actuation of said bleeding means.

6. The device as set forth in claim 1 wherein said solar collector has an inlet and an outlet, and further including a check valve disposed between said outlet and said tank to allow flow of said liquid only from said solar collector to said tank.

7. The valve as set forth in claim 3 wherein said compensating means acting on said valve member for applying a biasing force tending to move said valve member away from said valve seat in response to pressure in said valve tending to force said valve member toward said valve seat.

8. For use in a solar heating system having a solar collector, a storage tank connected to said solar collector, a pump for circulating liquid from said tank to said solar collector, and means for maintaining liquid in said solar collector at a predetermined pressure, said means including a supply of liquid at a temperature above freezing and a connection from said supply of liquid to said solar collector for replacing any liquid lost from said solar collector, a freeze protection device, comprising:
   means for sensing the temperature of liquid in said solar collector; and
   means for bleeding liquid from said solar collector when said sensed temperature falls below a predetermined minimum whereby cool liquid in said solar collector is automatically replaced by liquid at a temperature above freezing
   wherein said bleeding means comprises a valve disposed externally of said solar collector and a fluid line connecting said valve to said solar collector, and said means for sensing comprises a sensing bulb disposed in said solar collector, a control means responsive to said sensing bulb for opening and closing said valve and a housing disposed externally of said solar collector, a bellows disposed in said housing to define a fluid chamber between said housing and said bellows, and a capillary tube connecting said fluid chamber to said sensing bulb, wherein said fluid chamber, said bellows, said sensing bulb and said capillary tube contain a heat responsive fluid which is transformed from a liquid to a vapor in response to a rise in temperature, thereby increasing pressure in said housing to compress said bellows.

9. The device as set forth in claim 8 wherein said fluid is a fluorocarbon.

10. The device as set forth in claim 8 wherein the volume of said fluid in the liquid state is less than the volume of said sensing bulb and greater than the volume of said fluid chamber and said capillary tube.

11. For use in a solar heating system having a solar collector, a storage tank connected to said solar collector, a pump for circulating liquid from said tank to said solar collector, and means for maintaining liquid in said solar collector at a predetermined pressure, said means including a supply of liquid at a temperature above freezing and a connection from said supply of liquid to said solar collector for replacing any liquid lost from said solar collector, a freeze protection device, comprising:
- means for sensing the temperature of liquid in said solar collector; and
- means for bleeding liquid from said solar collector when said sensed temperature falls below a predetermined minimum whereby cool liquid in said solar collector is automatically replaced by liquid at a temperature above freezing,
- wherein said bleeding means comprises a pressure sensitive valve, and said sensing means comprises a sensing bulb disposed in said solar collector, means connecting said valve to said bulb to transmit pressure changes in said bulb to said valve, and a temperature sensitive fluid in said bulb, said temperature sensitive fluid comprising a liquid which changes to a gas in response to an increase in temperature, said temperature sensitive fluid creating a pressure which increases with an increase in temperature of said fluid, wherein said pressure sensitive valve comprises a valve body, a valve seat formed in said valve body, a valve member, means for biasing said valve member away from said valve seat, and means responsive to pressure from said fluid for holding said valve member on said valve seat.

12. The device as set forth in claim 11 wherein said valve body includes a liquid flow path, said valve seat and said valve member being disposed in said flow path, and wherein said pressure responsive means comprises a bellows having a first reaction surface in communication with said fluid and having a second reaction surface in communication with a compensating fluid, and including means for varying the pressure of said compensating fluid in response to a pressure of said liquid in said flow path.

13. The device as set forth in claim 12 wherein said means for varying the pressure of said compensating fluid comprises a diaphragm separating said compensating fluid from said flow path.

* * * * *